US010740015B2

(12) United States Patent
Giampaolo

(10) Patent No.: US 10,740,015 B2
(45) Date of Patent: Aug. 11, 2020

(54) OPTIMIZED MANAGEMENT OF FILE SYSTEM METADATA WITHIN SOLID STATE STORAGE DEVICES (SSDS)

(71) Applicant: Apple Inc., Cupertino, CA (US)

(72) Inventor: Dominic B. Giampaolo, Lewinston, ME (US)

(73) Assignee: Apple Inc., Cupertino, CA (US)

(*) Notice: Subject to any disclaimer, the term of this patent is extended or adjusted under 35 U.S.C. 154(b) by 278 days.

(21) Appl. No.: 15/720,320

(22) Filed: Sep. 29, 2017

(65) Prior Publication Data
US 2018/0293015 A1 Oct. 11, 2018

Related U.S. Application Data

(60) Provisional application No. 62/482,669, filed on Apr. 6, 2017.

(51) Int. Cl.
*G06F 17/00* (2019.01)
*G06F 3/06* (2006.01)
*G06F 16/11* (2019.01)
*G06F 16/16* (2019.01)

(52) U.S. Cl.
CPC .......... *G06F 3/0643* (2013.01); *G06F 3/065* (2013.01); *G06F 3/0613* (2013.01); *G06F 3/0688* (2013.01); *G06F 16/113* (2019.01); *G06F 16/164* (2019.01); *G06F 2003/0695* (2013.01)

(58) Field of Classification Search
CPC ...... G06F 3/0643; G06F 3/0688; G06F 3/065; G06F 3/0613; G06F 16/164; G06F 16/113; G06F 2003/0695; G06F 11/1446
See application file for complete search history.

(56) References Cited

U.S. PATENT DOCUMENTS

| | | |
|---|---|---|
| 5,758,334 A | 5/1998 | Knight, III et al. |
| 5,774,715 A | 6/1998 | Madany et al. |
| 6,353,837 B1 | 3/2002 | Blumenau |
| 6,643,654 B1 | 11/2003 | Patel et al. |
| 6,742,080 B1 | 5/2004 | Grimsrud et al. |

(Continued)

OTHER PUBLICATIONS

Thomas Talius et al., Transaction Log Based Application Error Recovery and Point In-Time Query, Proceedings of the VLDB Endowment: vol. 5 Issue 12, pp. 1781-1789, Aug. 2012.*

(Continued)

*Primary Examiner* — Greta L Robinson
(74) *Attorney, Agent, or Firm* — Dickinson Wright RLLP

(57) ABSTRACT

The embodiments set forth a technique for managing file nodes within a storage device. According to some embodiments, the method can include the steps of (1) receiving a transaction request that involves modifying a plurality of file nodes, (2) analyzing the plurality of file nodes against temporal transaction information to identify, among the plurality of file nodes, at least one group of file nodes that were previously modified in conjunction with at least one previously-executed transaction request, (3) modifying each file node in the at least one group of file nodes in accordance with the transaction request to establish a modified group of file nodes, (4) allocating, within the storage device, physical storage space for storing the modified group of file nodes, and (5) contiguously writing the modified group of file nodes into the allocated physical storage space.

20 Claims, 4 Drawing Sheets

(56) References Cited

U.S. PATENT DOCUMENTS

| | | | |
|---|---|---|---|
| 7,930,508 B2 | 4/2011 | Giampaolo | |
| 8,621,174 B2 | 12/2013 | Giampaolo | |
| 9,495,434 B1* | 11/2016 | Walton | G06F 16/178 |
| 2003/0093401 A1 | 5/2003 | Czajkowski et al. | |
| 2004/0101281 A1 | 5/2004 | Defrance et al. | |
| 2004/0193819 A1 | 9/2004 | Marinescu et al. | |
| 2005/0052549 A1 | 3/2005 | Schinner et al. | |
| 2011/0307534 A1* | 12/2011 | Peng | H04N 21/23109 707/827 |
| 2013/0262746 A1 | 10/2013 | Srinivasan | |
| 2013/0326186 A1* | 12/2013 | Shaikh | G06F 11/1435 711/170 |
| 2017/0032005 A1* | 2/2017 | Zheng | G06F 16/128 |
| 2017/0308563 A1* | 10/2017 | Chen | G06F 16/2365 |

OTHER PUBLICATIONS

Arash Tavakkol et al., Performance Evaluation of Dynamic Page Allocation Strategies in SSDs, ACM Transactions on Modeling and Performance Evaluation of Computing Systems, vol. 1 Issue 2, pp. 1-33, Jun. 2016.*

Yu-Jhang Cai et al., A Virtual Storage Environment for SSDs and HDDs in Xen Hypervisor, ACM SIGBED Review: vol. 11 Issue 2, pp. 39-44, Sep. 2014.*

Ruijin Zhou et al., An End-To-End Analysis of File System Features on Sparse Virtual Disks, ICS '14: Proceedings of the 28th ACM International Conferenece on Supercomputing, pp. 231-240, (Year: 2014).*

Gaimpaolo, Dominic, "Practical File System Design with the Be File System," San Francisco, CA; Morgan Kaufmann Publishers, Inc. (Year: 1999) pp. 7-32, 45-64.

Russinovich, Mark, et al., "Windows XP: Kernel Improvements Create a More Robust, Powerful, and Scalable OS," MSDN Magazine, Dec. 2001, 26 pages.

Sechrest, Stuart, et al., "Windows XP Performance," Microsoft Windows XP Operating System, Jun. 2001, 24 pages.

Fast System Startup for PCs Running Windows XP, Windows Platform Design Notes, Jan. 31, 2002, 27 pages.

* cited by examiner

Step 1: Receive a first transaction request that involves modifying file metadata nodes "A", "B", "C", and "D".

As no temporal transaction information is established, write "A", "B", "C", and "D" contiguously into storage.

Update temporal transaction information.

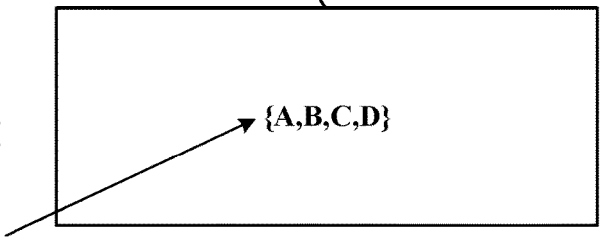

Step 2: Receive a second transaction request that involves modifying file metadata nodes "C", "D", "E", and "F".

Based on the temporal transaction information, write (1) "C" and "D" contiguously into storage, and (2) "E" and "F" contiguously into storage.

Update temporal transaction information.

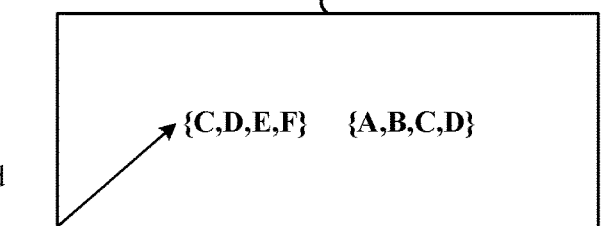

Step 3: Receive a third transaction request that involves modifying file metadata nodes "A", "B", "E", and "F".

Based on the temporal transaction information, (1) write "A" and "B" contiguously into storage, and (2) write "E" and "F" contiguously into storage.

Update temporal transaction information.

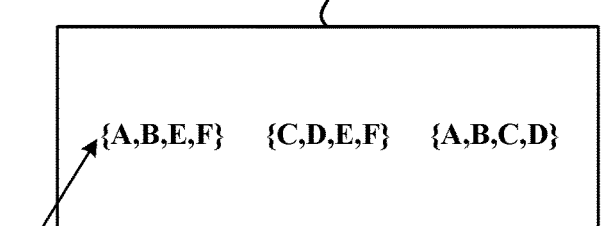

*FIG. 2*

OPTIMIZED MANAGEMENT OF FILE SYSTEM METADATA WITHIN SOLID STATE STORAGE DEVICES (SSDS)

CROSS-REFERENCE TO RELATED APPLICATIONS

The present application claims the benefit of U.S. Provisional Application No. 62/482,669, entitled "OPTIMIZED MANAGEMENT OF FILE SYSTEM METADATA WITHIN SOLID STATE STORAGE DEVICES (SSDs)," filed Apr. 6, 2017, the content of which is incorporated herein by reference in its entirety for all purposes.

FIELD

The described embodiments relate generally to the management of content within solid state storage devices (SSDs). More particularly, the described embodiments relate to optimizing the manner in which file system metadata is managed within SSDs that implement copy-on-write techniques.

BACKGROUND

Ever-increasing numbers of modern computing devices are being designed to utilize solid state drives (SSDs). Notably, while SSDs can provide a number of benefits over traditional, magnetic-based storage devices (e.g., hard drives), a number of their drawbacks have yet to be addressed. One example of a drawback stems from implementing a "copy-on-write" approach, in which any data undergoing modification is first copied, then modified, and then written into a different/available area of memory within the SSD. Notably, this can be problematic when carrying out transactions associated with certain types of data managed within the SSD—in particular, types of data that are frequently-modified, and where the average size of the data is less than or equal to the block size of the SSD. For example, in a given file system, respective file metadata for each file may require less than or equal to four kilobytes of storage, while the block size of the SSD is four kilobytes in size. In this example, performance encumbrances can quickly arise when transactions involve modifying a group of disparately-stored file metadata under the copy-on-write approach, where the SSD is burdened with carrying out small and isolated write operations.

Consequently, there exists a need for an improved technique for optimizing the manner in which file system metadata is managed within SSDs that implement copy-on-write techniques.

SUMMARY

Representative embodiments set forth herein disclose various techniques for optimizing the manner in which file system metadata is managed within SSDs that implement copy-on-write techniques.

According to some embodiments, a method for managing file nodes (e.g., metadata that corresponds to files) can be implemented by a computing device that is communicably coupled to a storage device, and can include the steps of (1) receiving a transaction request that involves modifying a plurality of file nodes, (2) analyzing the plurality of file nodes against temporal transaction information to identify, among the plurality of file nodes, at least one group of file nodes that were previously modified in conjunction with at least one previously-executed transaction request, (3) modifying each file node in the at least one group of file nodes in accordance with the transaction request to establish a modified group of file nodes, (4) allocating, within the storage device, physical storage space for storing the modified group of file nodes, and (5) contiguously writing the modified group of file nodes into the allocated physical storage space.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 2 illustrates a conceptual diagram that involves a file system manager referencing/managing temporal transaction information in accordance with transaction requests as they are received, according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Figure 1:
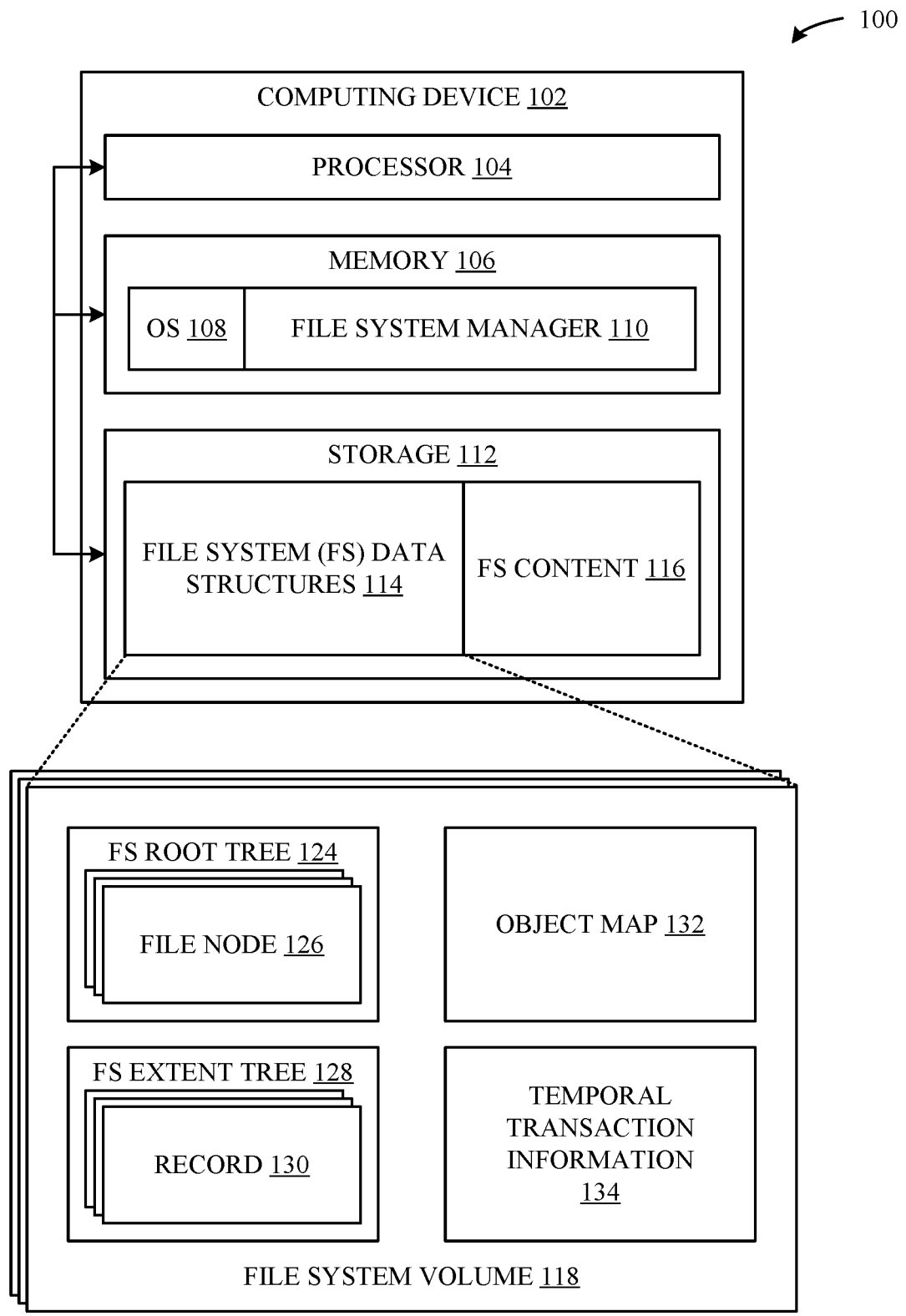
FIG. 1 illustrates a system diagram of a computing device that can be configured to perform the various techniques described herein, according to some embodiments.

FIG. 1 illustrates a block diagram 100 of different components of a computing device 102 configured to implement the various techniques described herein, according to some embodiments. More specifically, FIG. 1 illustrates a high-level overview of the computing device 102, which, as shown, can include a processor 104, a memory 106, and a storage device 112 (e.g., a solid state drive (SSD)). According to some embodiments, the processor 104 can be configured to work in conjunction with the memory 106 and the storage device 112 to enable the computing device 102 to operate in accordance with this disclosure. For example, the processor 104 can be configured to load an operating system (OS) 108 from the storage device 112 into the memory 106 for execution, where the OS 108 includes a file system manager 110 configured to implement various techniques described herein. Although not illustrated in FIG. 1, it is understood that the OS 108 can be configured to enable a variety of processes to execute on the computing device 102, e.g., OS daemons, native OS applications, user applications, and the like.

According to some embodiments, the file system manager 110 can represent logic/information for implementing the techniques described herein. For example, the file system manager 110 can be configured to implement one or more file system volumes 118 that each represents a separate and distinct file system within the computing device 102. According to some embodiments, the one or more file system volumes 118 can be configured to utilize the same physical storage space (in a non-conflicting/organized manner) within the storage device 112. This beneficially provides enhanced flexibility as each file system volume 118 can consume space within the storage device 112 on an as-needed basis. In addition, each file system volume 118 can be configured to enforce particular configurations (e.g., permissions, ownership, encryption schemes, etc.) independent from the configurations of other file system volumes 118 managed by the file system manager 110.

According to some embodiments, and as described in greater detail herein, the file system manager 110 can be configured to implement a "copy-on-write" approach. More specifically, when the file system manager 110 receives a request to modify a file, the file system manager 110 can write the changes into a new location within the storage device 112 in conjunction with modifying the data. In this manner, the file system manager 110 can be capable of performing crash recovery techniques, e.g., the file system manager 110 can reliably revert to a more stable version of a file system volume 118.

As shown in FIG. 1, the storage device 112 can include file system data structures 114 for each file system volume 118. According to some embodiments, the file system data structures 114 can be utilized by the file system manager 110 to manage corresponding file system content 116—i.e., actual file data—of the file system volumes 118. According to some embodiments, the file system data structures 114 can include (but are not limited to) (1) a file system root tree 124, (2) a file system extent tree 128, (3) an object map 132, and (4) temporal transaction information 134. As described in greater detail below, these various file system data structures 114 can collectively be utilized by the file system manager 110 to implement the techniques described herein.

According to some embodiments, the file system root tree 124 can include file nodes 126 that describe various aspects of the file system volume 118, e.g., directories, files, metadata associated with the files, and the like. Moreover, the file system extent tree 128 can include file system extent records 130 that can be used to track reference counts for file extents of file nodes 126 that belong to the file system root tree 124. According to some embodiments, a file system extent tree record 130 can include a starting logical file offset, a length (in bytes), a physical data block address, and an encryption identifier, among other information. Notably, the file system extent tree 128 can enable the file system manager 110 to track multiple file nodes 126, e.g., multiple file nodes 126 that reference the same data block address(es), thereby enabling cloning techniques to be implemented. Accordingly, the association between the file nodes 126 and the corresponding data block addresses can be stored within the file system extent records 130.

Notably, although it is understood that storing the records in a tree representation enables various operations—e.g., searches, sequential accesses, insertions, deletions, etc.—to be carried out in an efficient manner, the embodiments set forth herein are not limited to tree-based data structures. On the contrary, any data structure can be used to organize and access the records.

Additionally, and according to some embodiments, the file system data structures 114 can include an object map 132 that is an auxiliary data structure to the file system root tree 124, the file system extent tree 128, and the temporal transaction information 134. According to some embodiments, the object map 132 can be used to virtualize the manner in which the different file nodes 126 of the file system root tree 124 can be referenced. According to some embodiments, the object map 132 also can be configured to manage different snapshots of the file system volume 118 that are created over time, e.g., in conjunction with each backup of the file system volume 118.

Additionally, and according to some embodiments, the file system data structures 114 can include the temporal transaction information 134 that is managed/utilized by the file system manager 110. According to some embodiments, and as described in greater detail herein, the file system manager 110 can utilize the temporal transaction information 134 to effectively identify file nodes 126 that are "temporally" related to one another, e.g., based on transaction requests that are received and processed by the file system manager 110 throughout the operation of the computing device 102. In particular, the file system manager 110 can utilize the temporal transaction information 134 to identify temporal relationships between file nodes 126 as new transaction requests are received, and exploit the identified temporal relationships to enhance the manner in which the transaction requests are carried out. Moreover, the file system manager 110 can be configured to actively evolve the temporal transaction information 134 as the new transaction requests are received to increase the overall usefulness of referencing the temporal transaction information 134 when carrying out subsequent transaction requests. A more detailed description of the manner in which the file system manager 110 utilizes the temporal transaction information 134 is provided below in conjunction with FIG. 2.

FIG. 2 illustrates a conceptual diagram 200 that involves the file system manager 110 referencing/managing the temporal transaction information 134 in accordance with transaction requests as they are received, according to some embodiments. As shown in FIG. 2, a first step can involve the file system manager 110 receiving a first transaction request that involves modifying file nodes 126 "A", "B", "C", and "D". Notably, and as shown in FIG. 2, the temporal transaction information 134 is empty when the first transaction request is received. This can occur, for example, when a file system volume 118 (managed by the file system manager 110) is first established and transaction requests have not yet been processed.

It is noted that the temporal transaction information 134 is empty at the first step of FIG. 2 in the interest of simplifying this disclosure. However, in normal operation, the temporal transaction information 134 can include information about transaction requests received over any span of time. According to some embodiments, the amount of information retained in the temporal transaction information 134 can be adjusted in accordance with a variety of factors, e.g., performance metrics associated with the components of the computing device 102 (e.g., the processor 104, memory 106, storage 112, etc.), capacity metrics associated with the components of the computing device, and so on. For example, the file system manager 110 can be configured to purge older information in the temporal transaction information 134 that satisfies an expiration threshold. In another example, the file system manager 110 can be configured to purge older information in the temporal transaction information 134 when a size of the temporal transaction information 134 exceeds a threshold. In yet another example, the file system manager can be configured to purge information in the temporal transaction information 134 when a threshold number of transactions are processed—continue to do so each time a new transaction is processed—such that the temporal transaction information 134 serves as a moving window.

In any case, when the file system manager 110 receives the first transaction request, the file system manager 110 identifies that the temporal transaction information 134 is empty, and therefore cannot provide any guidance as to how the file nodes 126 might be processed in a more efficient manner. In this regard, the file system manager 110 can cause the file nodes 126 "A", "B", "C", and "D" to be written contiguously into the storage device 112. This can involve, for example, issuing a request to allocate contiguous blocks within the storage device 112 in accordance with a combined size of the file nodes 126 "A", "B", "C", and "D", and then writing these file nodes 126 into the allocated contiguous blocks. Alternatively, the file system manager 110 can be configured to allocate blocks in a disparate manner (i.e., disregarding contiguity), and instead write the file nodes 126 "A", "B", "C", and "D" in a contiguous fashion (e.g., one after another) into separated blocks across the storage device 112. As previously noted herein, the copy-on-write technique can be utilized when carrying out the first transaction request, which can involve first copying the file nodes 126 (in the original form) into a temporary area of memory, modifying them, and then writing them to allocated blocks within the storage device 112. In turn, the file system manager 110 can update the temporal transaction information 134 to reflect that the file nodes 126 "A", "B", "C", and "D" are temporally related to one another (as they were all modified by way of the first transaction request that was received).

At the conclusion of the first step, the temporal transaction information 134 now includes relational information about file nodes 126 "A", "B", "C", and "D" that the file system manager 110 can utilize when carrying out subsequent transaction requests that involve the same file nodes 126. For example, as shown in FIG. 2, a second step can involve the file system manager 110 receiving a second transaction request that involves modifying the file nodes 126 "C", "D", "E", and "F". In turn, the file system manager 110 can reference the temporal transaction information 134 and identify, among the file nodes 126 "C", "D", "E", and "F", any groups of file nodes 126 that are considered to be temporally related to one another. In the example illustrated in FIG. 2, the file system manager 110 would identify that (1) file nodes 126 "C" and "D" are related to one another (based on the first transaction request), and (2) file nodes 126 "E" and "F" are not known to be related (at least outside of the second transaction request). Accordingly, the file system manager 110 can be configured to write file nodes 126 "C" and "D" contiguously into the storage device 112 (e.g., in accordance with the copy-on-write techniques described herein), as they are considered to be related to one another by way of the first transaction request. Moreover, the file system manager 110 can be configured to write file nodes 126 "E" and "F" contiguously into the storage device 112, as they are considered to be related to one another by way of the second transaction request.

Notably, the file system manager 110 can be configured to utilize the temporal transaction information 134 under varying degrees of influence when processing transaction requests against file nodes 126. For example, in the second step of FIG. 2, the file system manager 110 may elect to take note of the fact that file nodes 126 "E" and "F" were associated with the second transaction request (by including them in the temporal transaction information 134), but choose not to write them contiguously into the storage device 112, as it may be a random temporal relationship that likely will not occur again. In this regard, the file system manager 110 can be configured to implement and utilize the temporal transaction information 134 according to any conceivable technique. For example, counters for each identified unique temporal relationship can be managed within the temporal transaction information 134, where the file system manager 110 chooses to write file nodes 126 contiguously only when a corresponding temporal relationship has been identified a threshold number of times (i.e., thereby indicating a stronger temporal relationship). Moreover, the file system manager 110 can be configured to associate time stamp information with each temporal relationship within the temporal transaction information 134 to enable old temporal relationships/temporal relationships considered to be obsolete to be purged from the temporal transaction information 134. Moreover, the temporal transaction information 134 can further include, for each identified temporal relationship between file nodes 126, the type of data associated with the file nodes 126, the actual relationship (if any) between the file nodes 126, and so on.

Turning back now to FIG. 2, a third step can involve the file system manager 110 receiving a third transaction request that involves modifying file nodes 126 "A", "B", "E", and "F". In this case, the file system manager 110 can utilize the temporal transaction information 134 to identify (1) that the file nodes 126 "A" and "B" are temporally related to one another (by way of the first transaction request), and (2) that the file nodes 126 "E" and "F" are temporally related to one another (by way of the second transaction request). In turn, the file system manager 110 can (1) write the file nodes 126 "A" and "B" contiguously into the storage device 112 (again, in accordance with the copy-on-write techniques described herein), and (2) write the file nodes 126 "E" and "F" contiguously into the storage device 112. Finally, at the conclusion of the third step, the file system manager 110 can update the temporal transaction information 134 to reflect the temporal relationship between the file nodes 126 "A", "B", "E", and "F".

Figure 3:
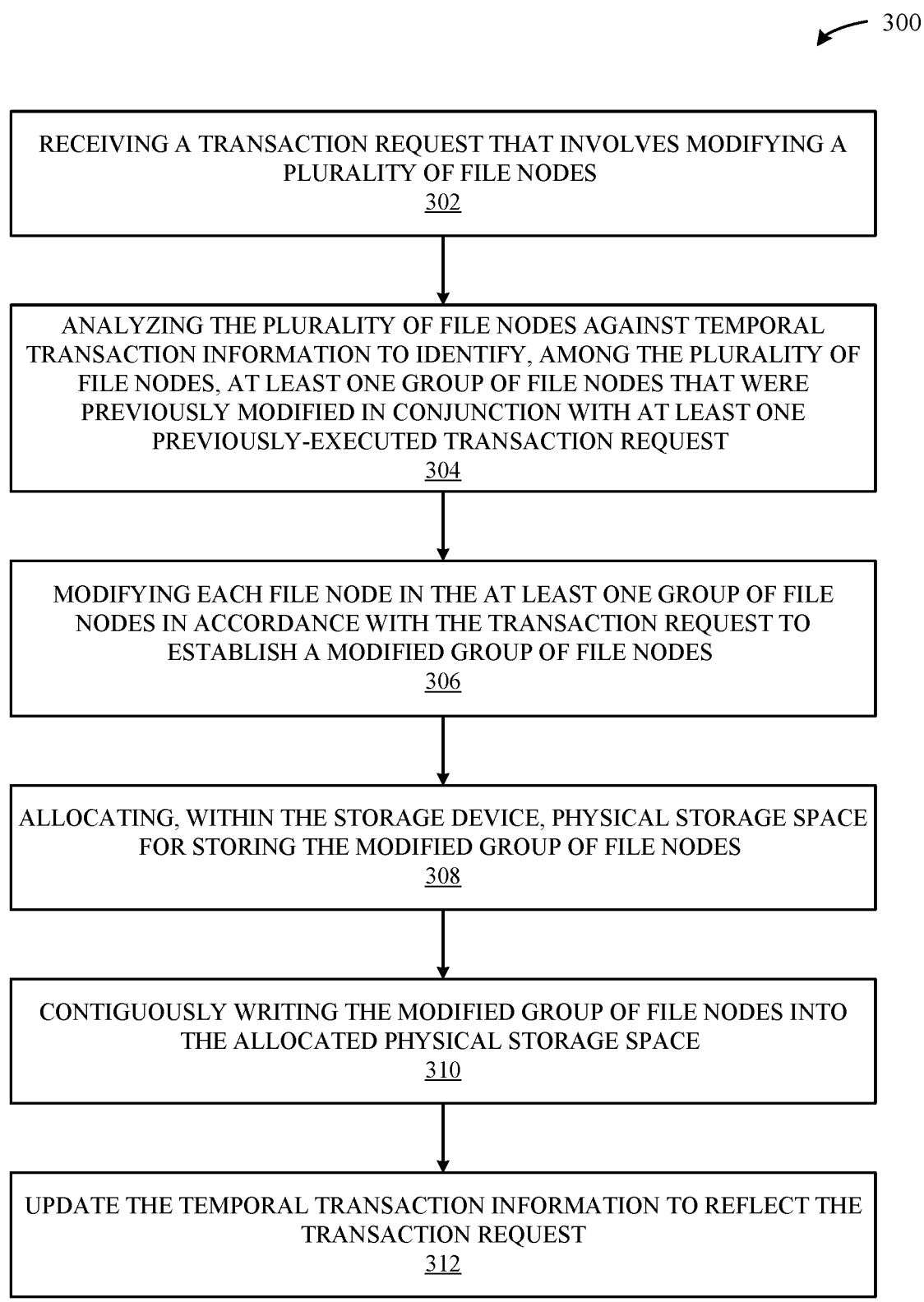
FIG. 3 illustrates a method for managing file nodes within a storage device, according to some embodiments.

FIG. 3 illustrates a method 300 for managing file nodes 126 within the storage device 112, according to some embodiments. As shown in FIG. 3, the method 300 begins at step 302, and involves the file system manager 110 receiving a transaction request that involves modifying a plurality of file nodes 126 (e.g., the first step described above in conjunction with FIG. 2).

Step 304 involves the file system manager 110 analyzing the plurality of file nodes 126 against temporal transaction information 134 to identify, among the plurality of file nodes 124, at least one group of file nodes 126 that were previously modified in conjunction with at least one previously-executed transaction request (e.g., as described above in conjunction with steps two and three of FIG. 2). Step 306 involves the file system manager 110 modifying each file node 126 in the at least one group of file nodes 126 in accordance with the transaction request to establish a modified group of file nodes 126. Step 308 involves the file system manager 110 allocating, within the storage device 112, physical storage space for storing the modified group of file nodes 126. As previously described herein, the file system manager 110 can attempt to allocate contiguous physical storage space for the modified group of file nodes 126, but this is not necessary. Instead, the file system manager 110 can allocate disparate blocks within the storage device 112, while writing the modified group of file nodes 126 in a contiguous manner. Step 310 involves the file system manager 110 writing the modified group of file nodes 126 into the allocated physical storage space.

Finally, step 312 involves the file system manager 110 updating the temporal transaction information 134 to reflect the transaction request received at step 302 (e.g., as described above in conjunction with steps two and three of FIG. 2).

Figure 4:
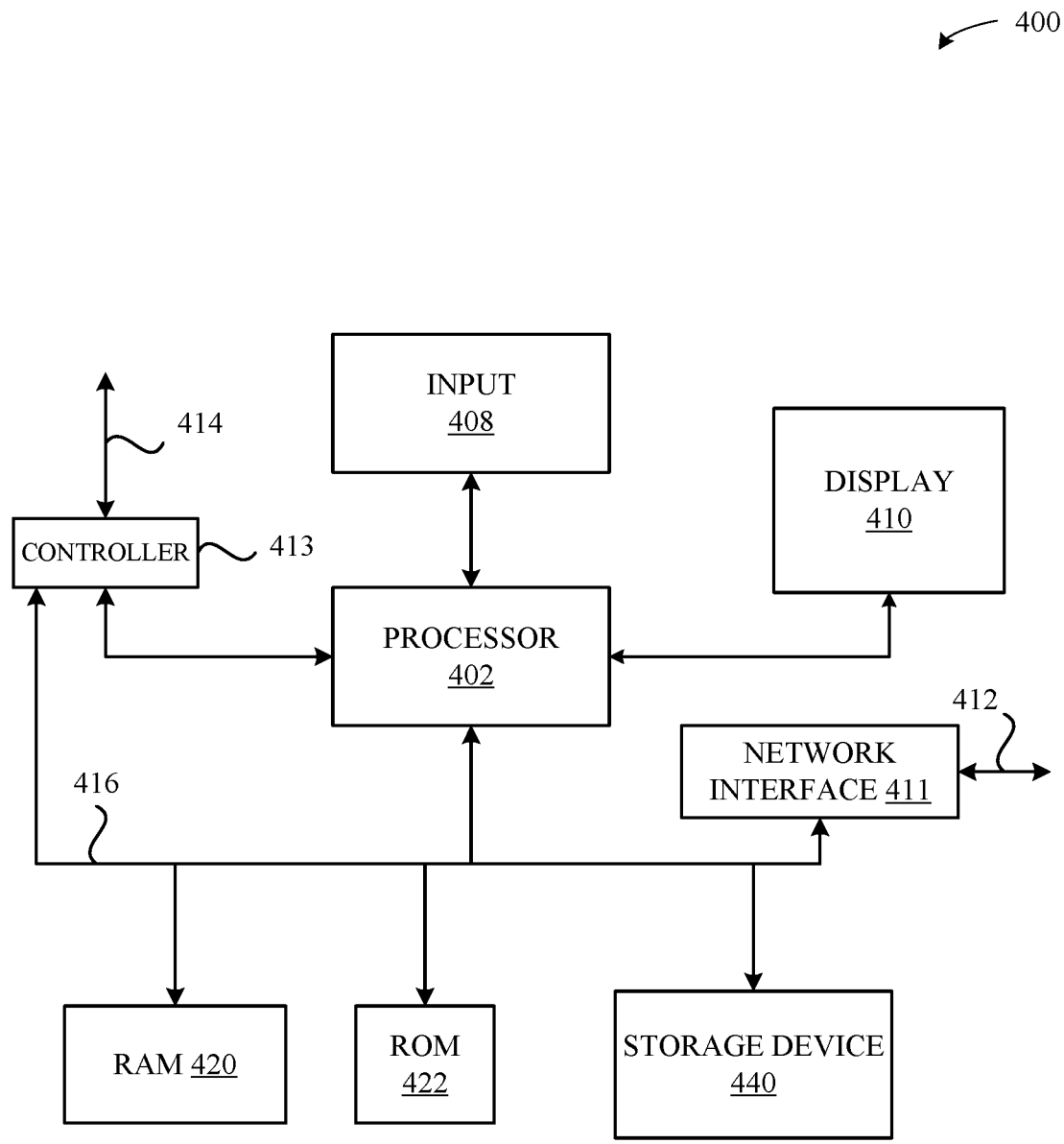
FIG. 4 illustrates a detailed view of a computing device that can be used to implement the various techniques described herein, according to some embodiments.

FIG. 4 illustrates a detailed view of a computing device 400 that can be used to implement the various techniques described herein, according to some embodiments. In particular, the detailed view illustrates various components that can be included in the computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the file system manager 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing file nodes within a storage device, the method comprising, at a computing device that is communicably coupled to the storage device:
    receiving a transaction request that involves modifying a plurality of file nodes;
    analyzing the plurality of file nodes against temporal transaction information to identify, among the plurality of file nodes, at least one group of file nodes that were previously modified in conjunction with at least one previously-executed transaction request;
    modifying each file node in the at least one group of file nodes in accordance with the transaction request to establish a modified group of file nodes;
    allocating, within the storage device, physical storage space for storing the modified group of file nodes;
    contiguously writing the modified group of file nodes into the physical storage space; and
    updating the temporal transaction information to reflect the plurality of file nodes involved in the transaction request.

2. The method of claim 1, further comprising, in response to identifying that a purge threshold is satisfied:
    removing, from the temporal transaction information, at least one oldest group of file nodes identified by the temporal transaction information.

3. The method of claim 1, wherein modifying each file node in the at least one group of file nodes in accordance with the transaction request to establish the modified group of file nodes comprises:
    copying the file node to establish a copy of the file node, and modifying the copy of the file node to establish a modified file node.

4. The method of claim 1, wherein each file node of the plurality of file nodes comprises metadata associated with a respective file stored on the storage device.

5. The method of claim 1, further comprising, subsequent to writing the modified group of file nodes into the physical storage space:
    receiving a subsequent transaction request to trim the modified group of file nodes; and
    trimming the modified group of file nodes via a single operation.

6. The method of claim 1, further comprising:
    performing the modifying, allocating, and writing steps for each remaining file node of the plurality of file nodes that is not included in the at least one group of file nodes.

7. The method of claim 1, wherein the temporal transaction information is generated in conjunction with processing an initial transaction request, and is updated in conjunction with processing additional transaction requests.

8. At least one non-transitory computer readable storage medium configured to store instructions that, when executed by at least one processor included in a computing device, cause the computing device to manage file nodes within a storage device, by carrying out steps that include:
    receiving a transaction request that involves modifying a plurality of file nodes;
    analyzing the plurality of file nodes against temporal transaction information to identify, among the plurality of file nodes, at least one group of file nodes that were previously modified in conjunction with at least one previously-executed transaction request;
    modifying each file node in the at least one group of file nodes in accordance with the transaction request to establish a modified group of file nodes;
    allocating, within the storage device, physical storage space for storing the modified group of file nodes;
    contiguously writing the modified group of file nodes into the physical storage space;
    updating the temporal transaction information to reflect the plurality of file nodes involved in the transaction request.

9. The at least one non-transitory computer readable storage medium of claim 8, wherein the steps further include, in response to identifying that a purge threshold is satisfied:
    removing, from the temporal transaction information, at least one oldest group of file nodes identified by the temporal transaction information.

10. The at least one non-transitory computer readable storage medium of claim 8, wherein modifying each file node in the at least one group of file nodes in accordance with the transaction request to establish the modified group of file nodes comprises:
    copying the file node to establish a copy of the file node, and modifying the copy of the file node to establish a modified file node.

11. The at least one non-transitory computer readable storage medium of claim 8, wherein each file node of the plurality of file nodes comprises metadata associated with a respective file stored on the storage device.

12. The at least one non-transitory computer readable storage medium of claim 8, wherein the steps further include, subsequent to writing the modified group of file nodes into the physical storage space:
    receiving a subsequent transaction request to trim the modified group of file nodes; and
    trimming the modified group of file nodes via a single operation.

13. The at least one non-transitory computer readable storage medium of claim 8, wherein the steps further include:
    performing the modifying, allocating, and writing steps for each remaining file node of the plurality of file nodes that is not included in the at least one group of file nodes.

14. The at least one non-transitory computer readable storage medium of claim 8, wherein the temporal transaction information is generated in conjunction with processing an initial transaction request, and is updated in conjunction with processing additional transaction requests.

15. A computing device configured to manage file nodes within a storage device, the computing device comprising:
    at least one processor; and
    at least one memory storing instructions that, when executed by the at least one processor, cause the computing device to:
        receive a transaction request that involves modifying a plurality of file nodes;
        analyze the plurality of file nodes against temporal transaction information to identify, among the plurality of file nodes, at least one group of file nodes that were previously modified in conjunction with at least one previously-executed transaction request;
        modify each file node in the at least one group of file nodes in accordance with the transaction request to establish a modified group of file nodes;
        allocate, within the storage device, physical storage space for storing the modified group of file nodes;
        contiguously write the modified group of file nodes into the physical storage space; and
        update the temporal transaction information to reflect the plurality of file nodes involved in the transaction request.

16. The computing device of claim 15, wherein the at least one processor further causes the computing device to, in response to identifying that a purge threshold is satisfied:
    remove, from the temporal transaction information, at least one oldest group of file nodes identified by the temporal transaction request information.

17. The computing device of claim 15, wherein modifying each file node in the at least one group of file nodes in accordance with the transaction request to establish the modified group of file nodes comprises:
    copying the file node to establish a copy of the file node, and modifying the copy of the file node to establish a modified file node.

18. The computing device of claim 15, wherein each file node of the plurality of file nodes comprises metadata associated with a respective file stored on the storage device.

19. The computing device of claim 15, wherein the at least one processor further causes the computing device to, subsequent to writing the modified group of file nodes into the physical storage space:
    receive a subsequent transaction request to trim the modified group of file nodes; and
    trim the modified group of file nodes via a single operation.

20. The computing device of claim 15, wherein the at least one processor further causes the computing device to:
    perform the modifying, allocating, and writing steps for each remaining file node of the plurality of file nodes that is not included in the at least one group of file nodes.

* * * * *

UNITED STATES PATENT AND TRADEMARK OFFICE
CERTIFICATE OF CORRECTION

PATENT NO. : 10,740,015 B2
APPLICATION NO. : 15/720320
DATED : August 11, 2020
INVENTOR(S) : Dominic B. Giampaolo It is certified that error appears in the above-identified patent and that said Letters Patent is hereby corrected as shown below:

In the Claims

In Claim 16, at Column 10, Line 32: "temporal transaction request information." should read
-- temporal transaction information. --.

Signed and Sealed this
Sixth Day of October, 2020

Andrei Iancu
*Director of the United States Patent and Trademark Office*